United States Patent
Gruber et al.

[19]

[11] Patent Number: 6,105,798
[45] Date of Patent: Aug. 22, 2000

[54] RACK WITH SPECIAL MOUNTING ARRANGEMENT

[75] Inventors: Robert D. Gruber, New Lenox; Allen B. Kautz, Wheaton, both of Ill.

[73] Assignee: Interlake Material Handling, Inc., Naperville, Ill.

[21] Appl. No.: 09/187,777

[22] Filed: Nov. 6, 1998

[51] Int. Cl.[7] .................................................. A47F 1/00
[52] U.S. Cl. .......................... 211/151; 211/59.2; 211/191
[58] Field of Search .................................. 211/151, 59.2, 211/191, 134, 26, 192, 189, 190, 153, 187; 193/35 R; 403/231, 292

[56] References Cited

U.S. PATENT DOCUMENTS

| | | |
|---|---|---|
| 1,745,784 | 2/1930 | Davis . |
| 2,669,361 | 2/1954 | Just . |
| 2,964,154 | 12/1960 | Erickson . |
| 2,982,387 | 5/1961 | Hinckley ................................ 193/35 R |
| 3,063,534 | 11/1962 | Amour . |
| 3,266,635 | 8/1966 | McConnell ............................ 193/35 R |
| 3,269,557 | 8/1966 | Wahl . |
| 3,285,428 | 11/1966 | Scheck . |
| 3,556,306 | 1/1971 | Shelf . |
| 3,695,456 | 10/1972 | Lewis ...................................... 211/191 |
| 3,900,112 | 8/1975 | Azzi et al. . |
| 3,905,712 | 9/1975 | McConnell . |
| 4,186,860 | 2/1980 | Corey et al. . |
| 4,239,100 | 12/1980 | Corey . |
| 4,372,451 | 2/1983 | Rasmussen et al. . |
| 4,383,614 | 5/1983 | Miller ..................................... 211/59.2 |
| 4,394,910 | 7/1983 | Miller ..................................... 211/59.2 |
| 4,401,221 | 8/1983 | Suttles . |
| 4,453,641 | 6/1984 | Rasmussen et al. . |
| 4,662,523 | 5/1987 | Stein et al. . |
| 4,681,203 | 7/1987 | Kornylak .............................. 193/35 R |
| 4,765,493 | 8/1988 | Kinney .................................. 211/59.2 |
| 4,909,402 | 3/1990 | Highsmith . |
| 4,955,490 | 9/1990 | Schafer .................................. 211/191 |
| 5,090,547 | 2/1992 | Schäfer . |
| 5,115,920 | 5/1992 | Tipton et al. . |
| 5,259,518 | 11/1993 | Sorenson et al. ...................... 211/59.2 |
| 5,279,430 | 1/1994 | Benton . |
| 5,360,122 | 11/1994 | Benton .................................. 211/151 |
| 5,450,968 | 9/1995 | Bustos . |
| 5,474,412 | 12/1995 | Pfeiffer et al. ........................ 193/35 R |
| 5,779,064 | 7/1998 | Dolling ................................. 211/59.2 |
| 5,845,794 | 12/1998 | Highsmith ............................. 211/189 |
| 5,887,732 | 3/1999 | Zimmer et al. ....................... 211/59.2 |

FOREIGN PATENT DOCUMENTS

8713208 U   2/1988   Germany .

*Primary Examiner*—Daniel P. Stodola
*Assistant Examiner*—Jennifer E. Novosad
*Attorney, Agent, or Firm*—Theresa Fritz Camoriano; Camoriano and Associates

[57] ABSTRACT

A rack is provided with shelves that are well-secured. The corners of each shelf are connected by a hook on one member dropped vertically down into a slot of the other member, and, once the members are properly aligned with the hook and slot, they are secured with a bolt. Beams, such as roller beams, guide beams, and support beams are connected to the frame members by means of upwardly-projecting trees on the frame members, which include arms that fit into holes in the vertical legs of the beams. Clips may be used after the beams are installed on the frame members to prevent the vertical legs of the beams from shifting, thereby further securing the beams to the shelf.

13 Claims, 16 Drawing Sheets

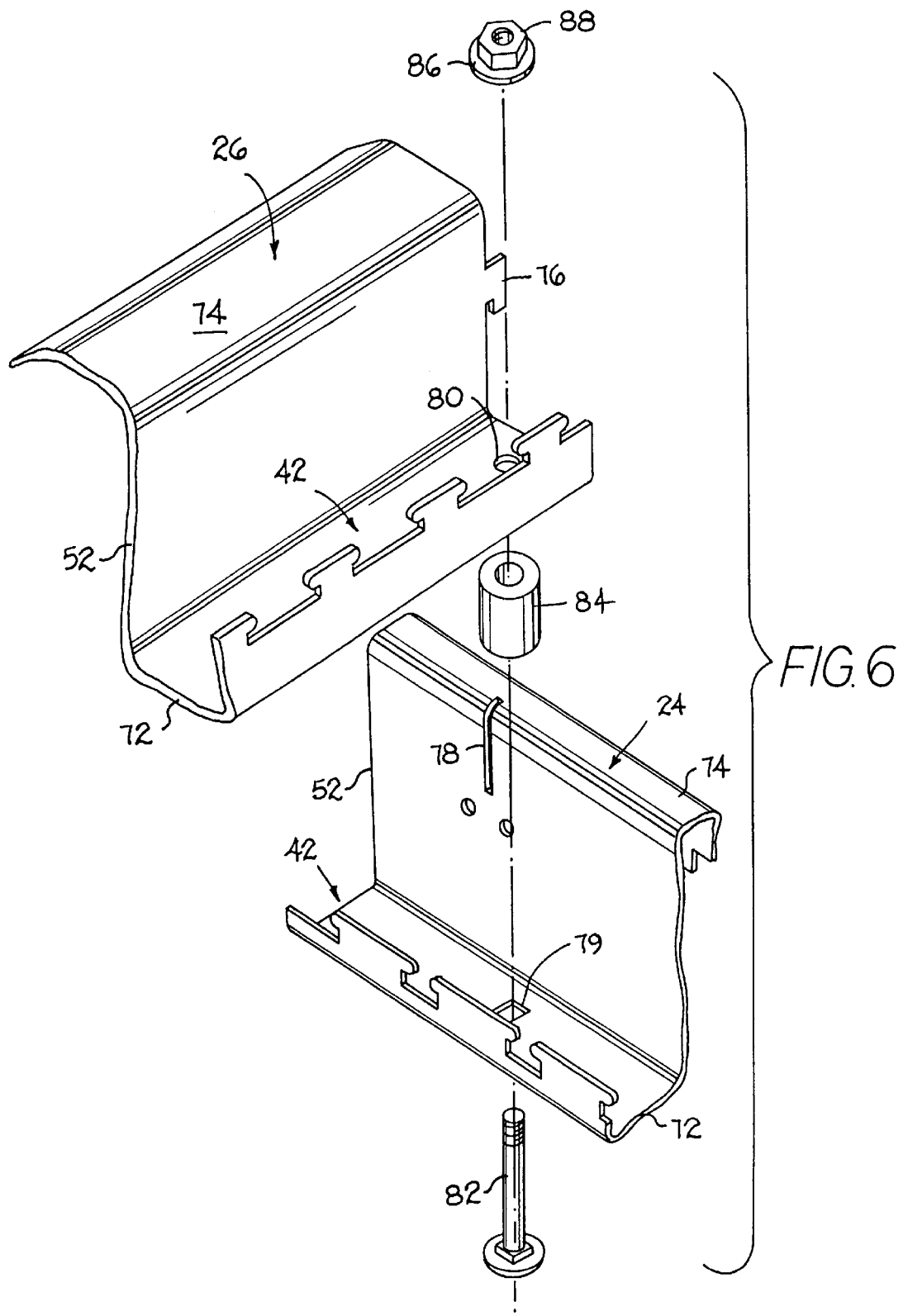

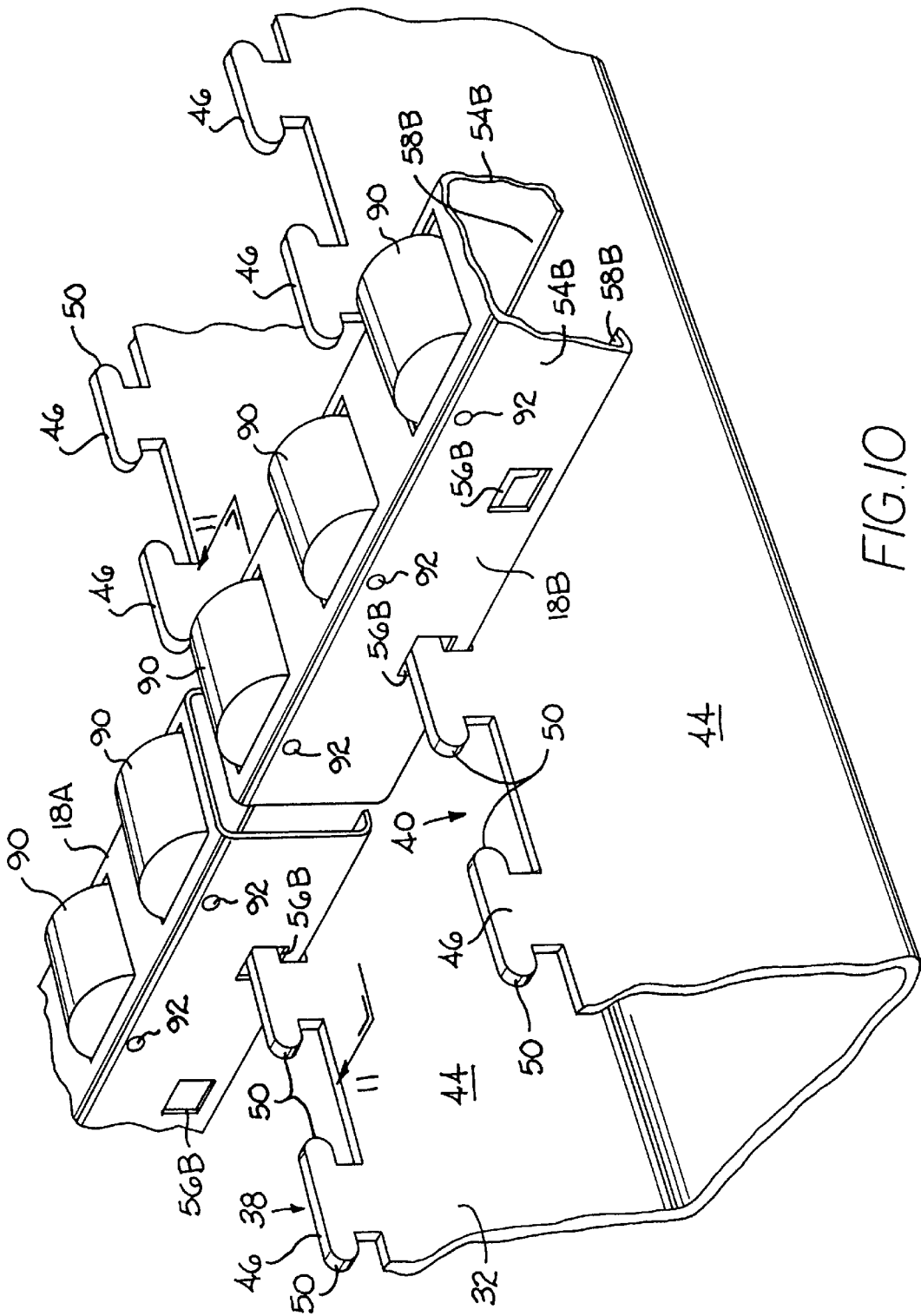

6,105,798

1

RACK WITH SPECIAL MOUNTING ARRANGEMENT

BACKGROUND OF THE INVENTION

The present invention relates to racks, and, in particular, to racks that include shelves that are mounted at an incline and include rollers so that products may be inserted at the rear of the rack and roll on the rollers to the front of the rack. Many racks of this type are known.

One of the problems with these racks is trying to find a simple, low cost way of securely assembling the shelves of the rack. Many types of shelf assemblies are known for assembling the framework of the shelves together and for mounting roller tracks and guide rails on the framework, but they do not secure the framework, tracks, and rails together well enough, or they are too expensive to manufacture and assemble economically.

Also, typically, when the framework of the shelf is being assembled, the pieces must be moved into place from outside the assembled dimensions of the rack, which may make assembly difficult.

SUMMARY OF THE INVENTION

The present invention provides a rack that is secure, inexpensive to manufacture, and inexpensive to assemble.

The design of the present invention prevents the roller tracks and guide rails from coming loose from the frame. It also permits a greater number or different type of roller tracks to be mounted in the rear portion of the rack from the type and number mounted in the front portion of the rack, so that, for example, the part of the rack that receives the greatest impact from products being dropped onto the rack has sufficient structure to absorb that impact without damaging the rack, while not requiring the entire rack to be built to withstand the impact.

Also, the left, right, front, and rear frame members are assembled by dropping a hooked member directly down into a groove of the other member, thereby eliminating the awkward prior art assembly methods that required pieces to be moved in from the side or back of the rack.

BRIEF DESCRIPTION OF THE DRAWINGS

FIG. 6 is a broken-away, exploded perspective view of the right rear corner of the frame of FIG. 2;

2

Figure 1:
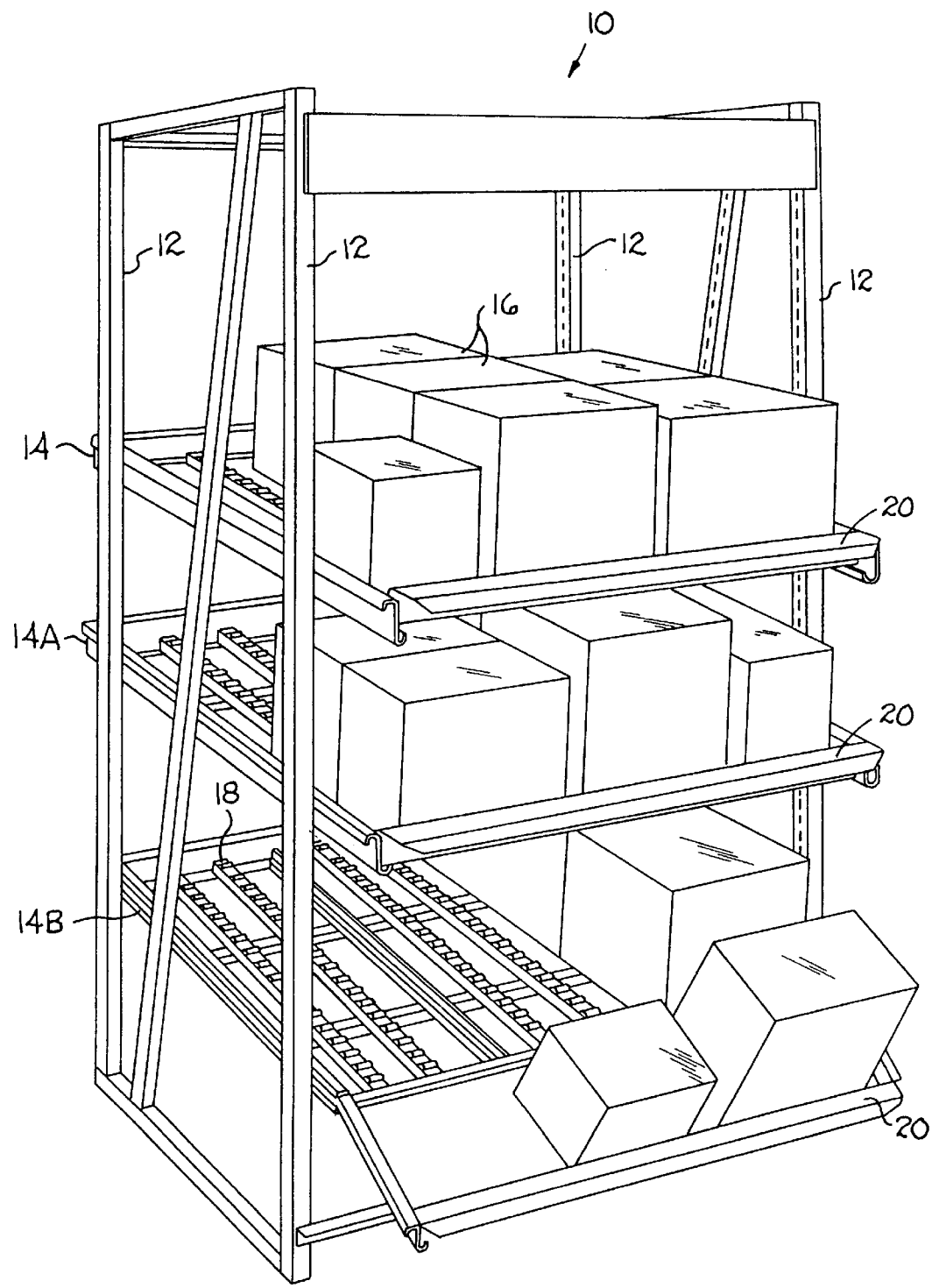
FIG. 1 is a front perspective view of a rack made in accordance with the present invention.
Figure 2:
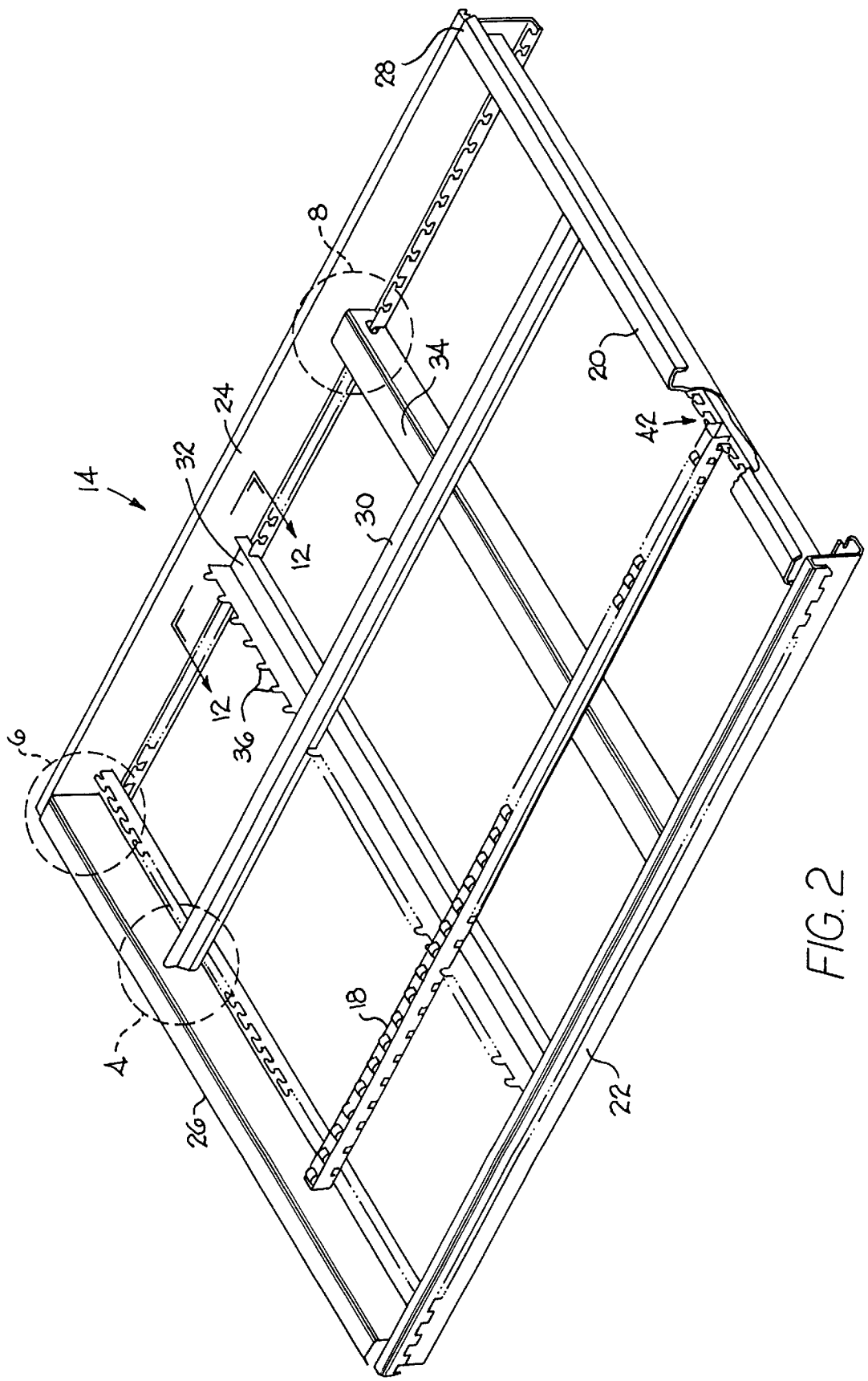
FIG. 2 is a front perspective view, partially broken away, of the top shelf of the rack of FIG. 1.
Figure 3:
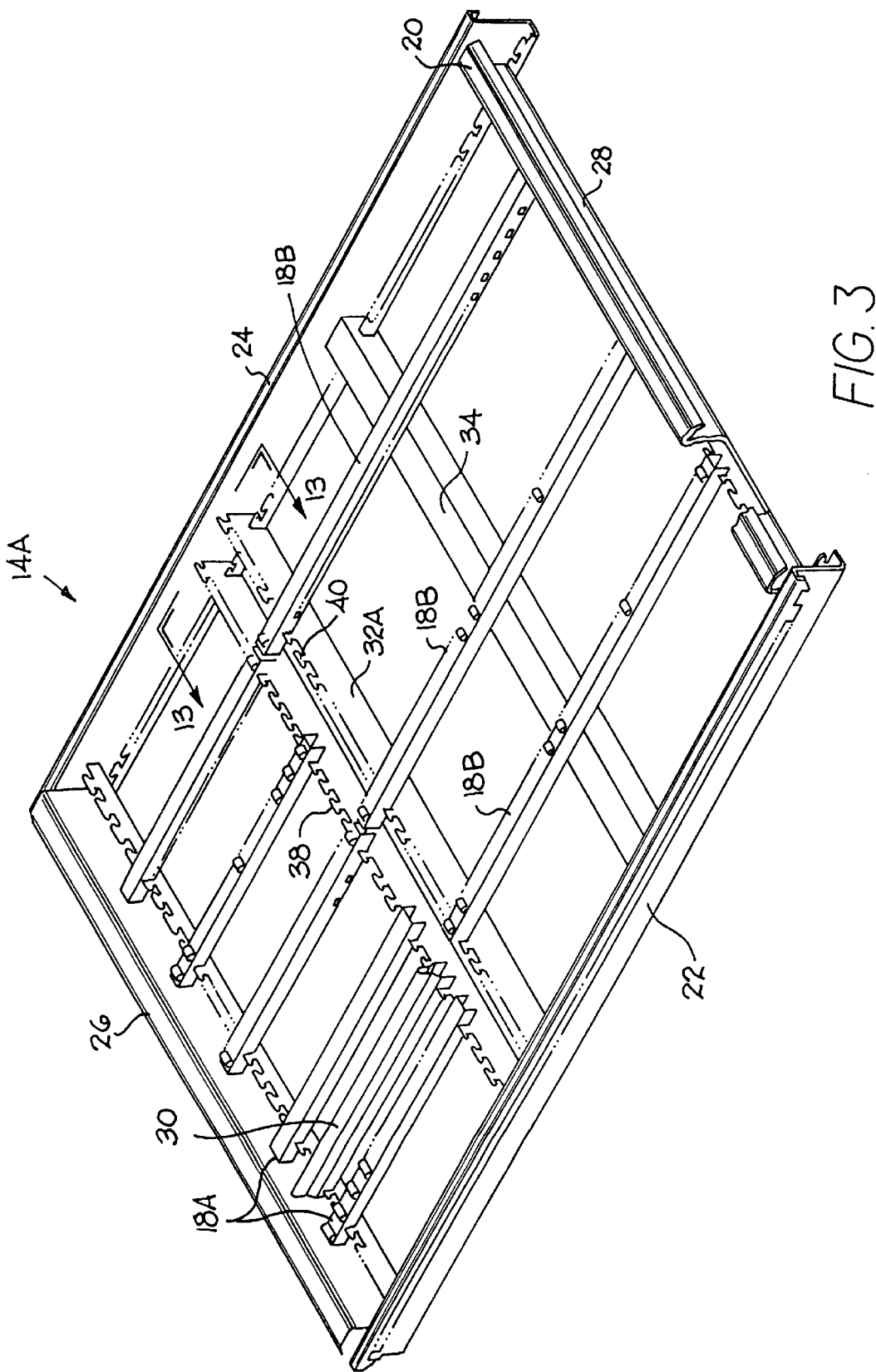
FIG. 3 is a front perspective view, partially broken away, of the middle shelf of the rack of FIG. 1.
Figure 11:
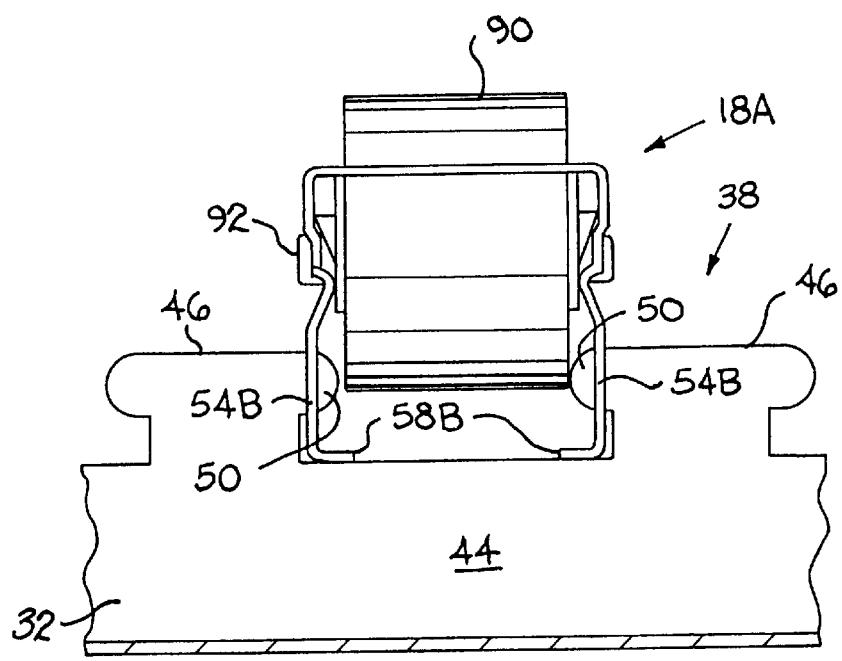
Figure 12:
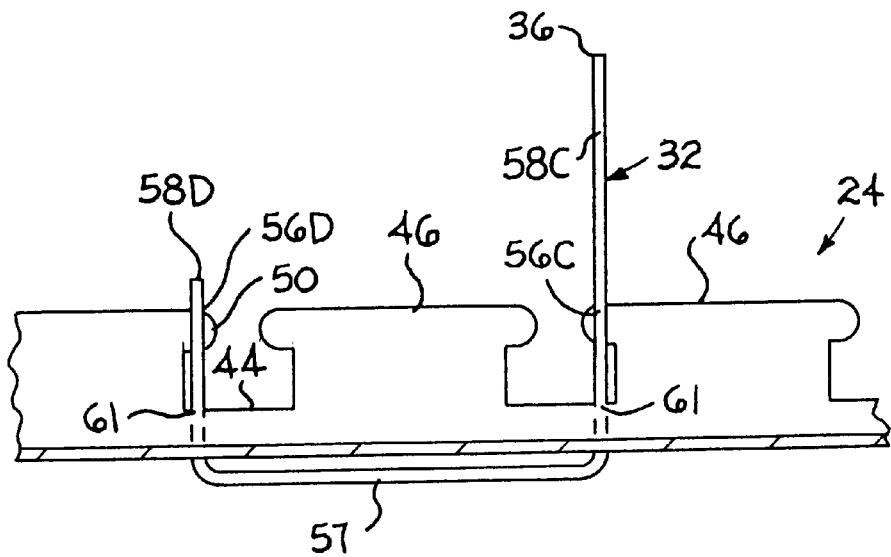
Figure 13:
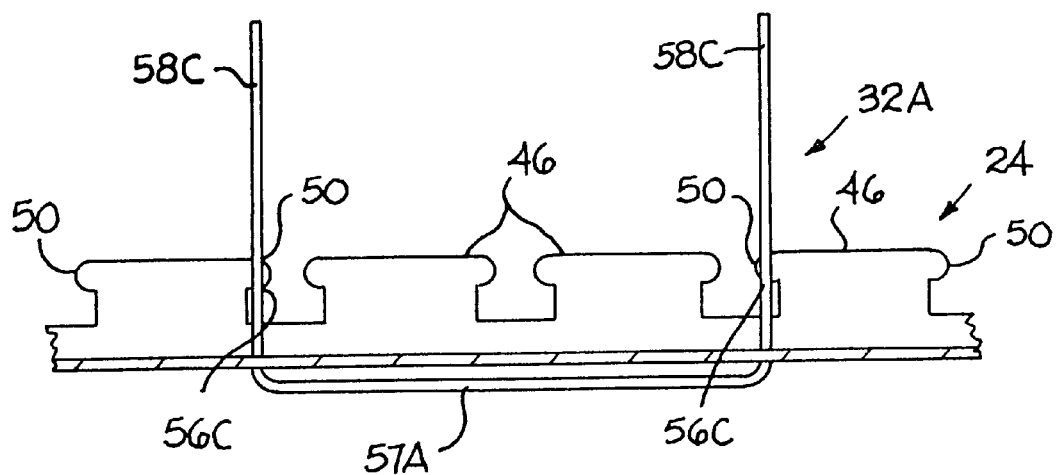
Figure 14:
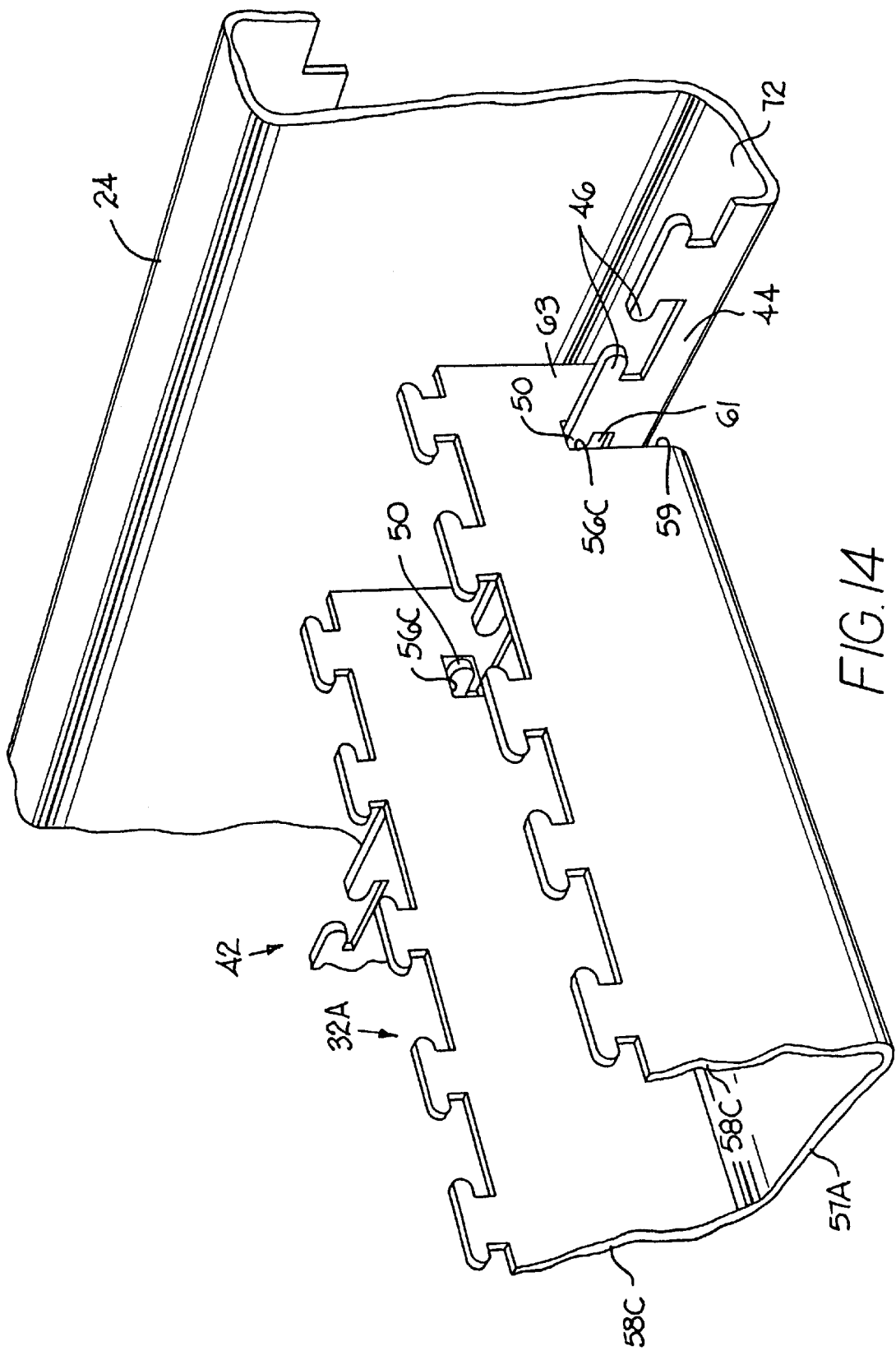
Figure 14A:
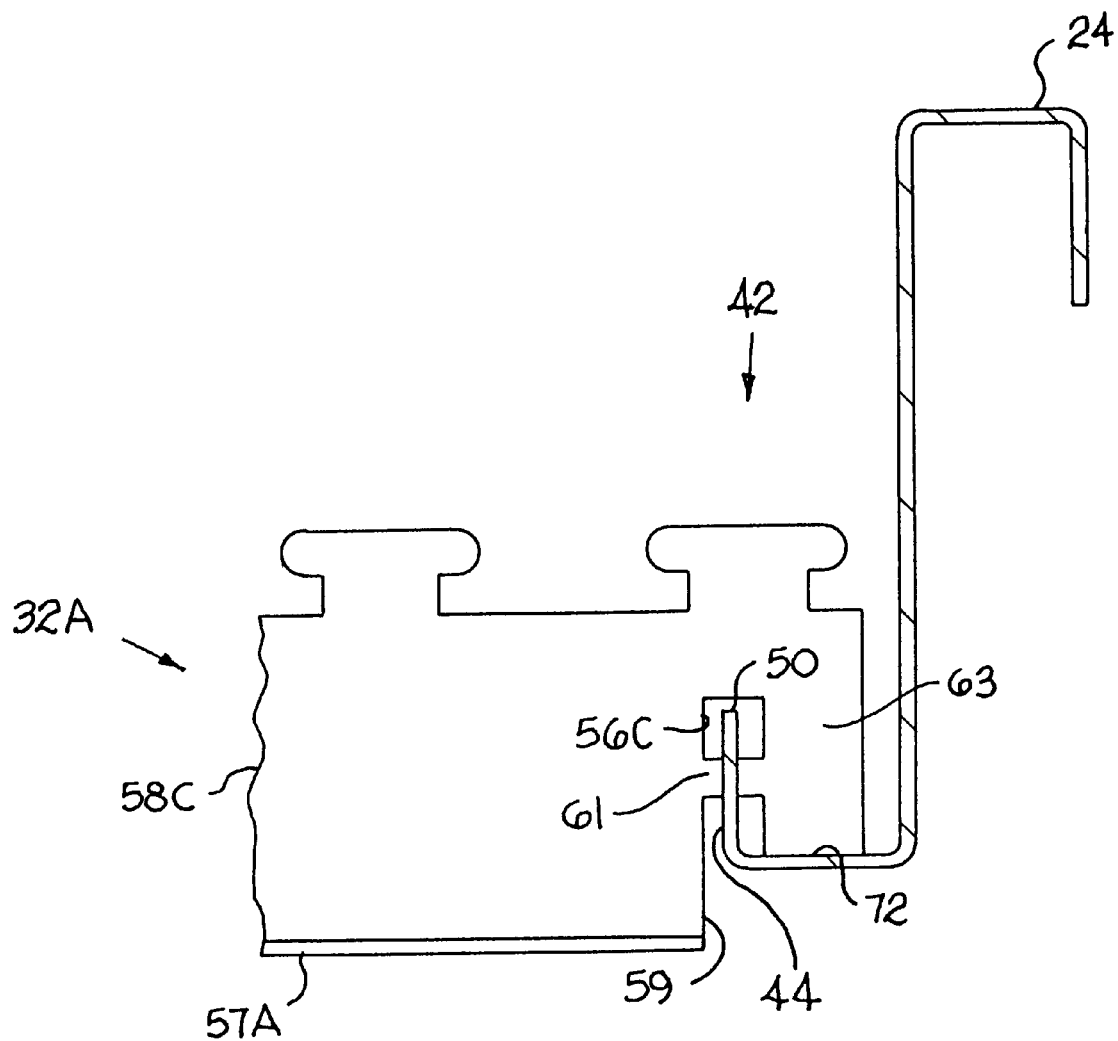
Figure 15:
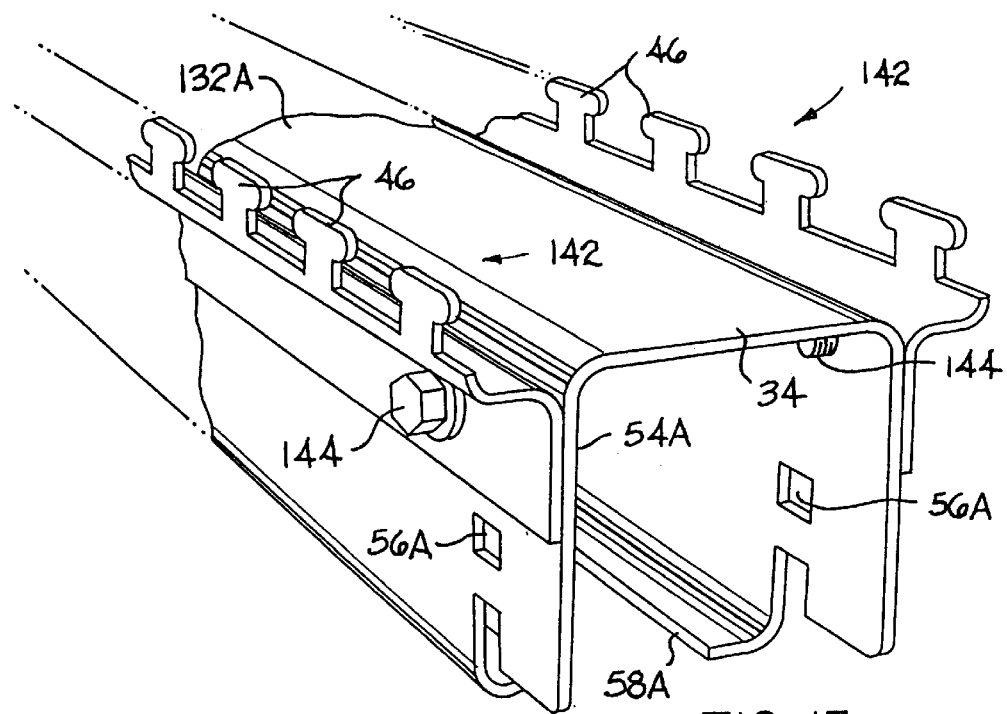
Figure 16:
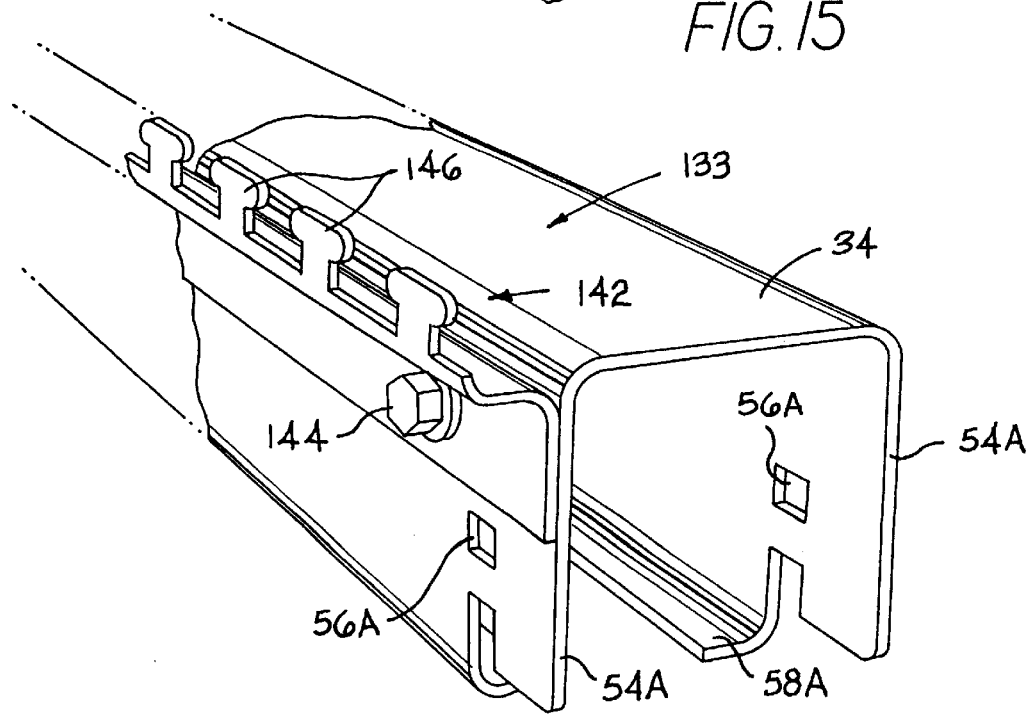
Figure 17:
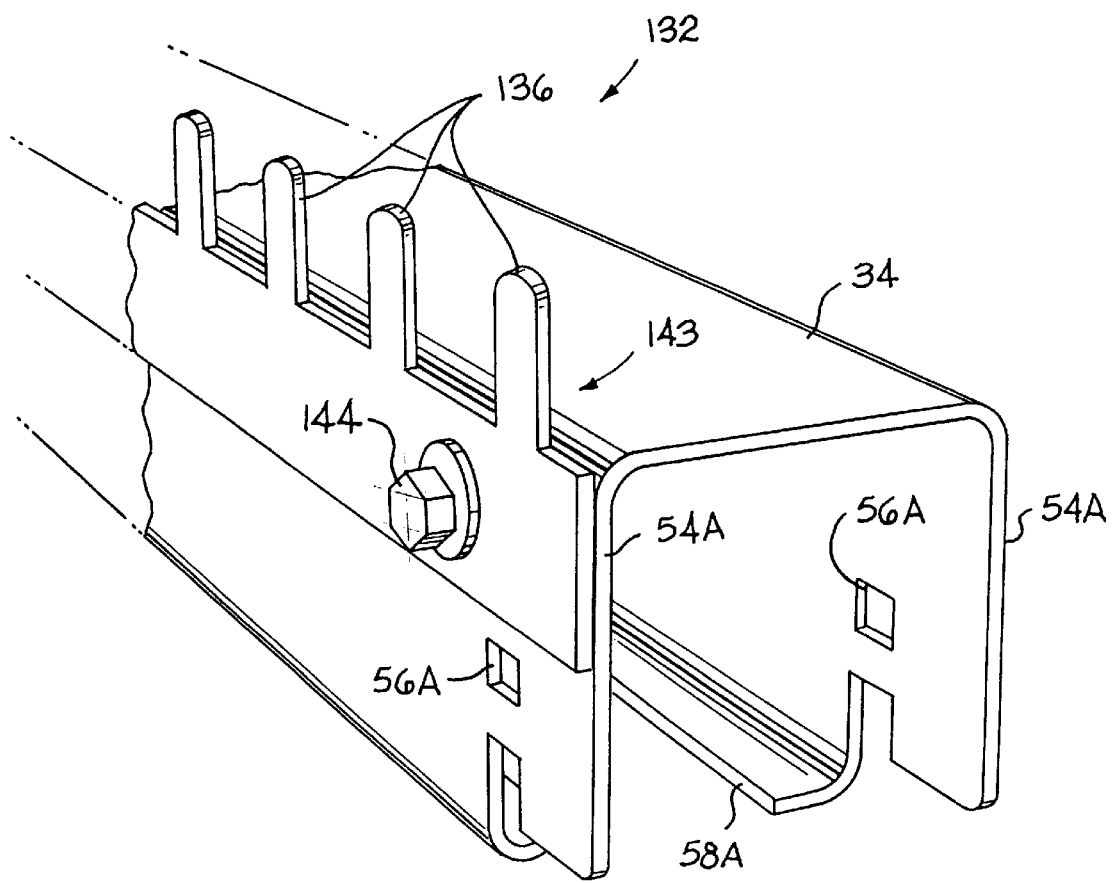

FIG. 10 is a broken-away perspective view showing two roller tracks being mounted on the rear intermediate support of FIG. 3;

FIG. 11 is a view taken along the line 11—11 of FIG. 10;

FIG. 12 is a view taken along the line 12—12 of FIG. 2;

FIG. 13 is a view taken along the line 13—13 of FIG. 3;

FIG. 14 is a perspective view of the portion of the shelf shown in FIG. 13;

FIG. 14A is a front sectional view of the portion of the shelf shown in FIG. 14;

FIG. 15 is a perspective view of an alternate embodiment of an intermediate support for use in the frame of FIG. 3;

FIG. 16 is a perspective view of an alternative embodiment of an intermediate support for use in the shelf 14B of FIG. 1; and FIG. 17 is a perspective view of an alternative embodiment of an intermediate support for use in the frame of FIG. 2.

DESCRIPTION OF THE PREFERRED EMBODIMENTS:

FIG. 1 is a perspective view of a rack 10 made in accordance with the present invention. The rack 10 includes a plurality of upright supports 12 onto which is mounted a plurality of shelves 14, 14A, 14B. U.S. Pat. No. 5,115,920 "Tipton", which is hereby incorporated by reference, shows a preferred method of mounting the shelves 14, 14A, 14B onto the upright supports 12 to form the rack. The shelves 14, 14A, 14B preferably are mounted with the rear of each shelf higher than the front, so that products 16 are inserted at the rear of the rack 10, roll down roller tracks 18, and are removed from the front of the rack 10. There is a raised lip 20 at the front of each shelf 14, 14A, 14B which catches the products 16 and prevents them from falling off the front of the rack 10.

FIG. 2 shows the top shelf 14 in more detail. The shelf 14 is made up of a left frame member 22, a right frame member 24, a rear frame member 26, and a front frame member 28. This figure shows only a single roller track 18 mounted on the shelf 14, extending from the rear frame member 26 to the front frame member 28, but it is understood that there are several roller tracks 18 mounted parallel to each other on the shelf 14. This figure also shows a single guide member 30 mounted parallel to the roller track 18 and extending from the rear frame member 26 to the front frame member 28, and it is understood that there may be more than one guide member 30 mounted on the shelf 14, as needed, depending upon the size of the packages 16 that are expected to be put on the shelf 14.

FIG. 2 also shows that there are two intermediate left-to-right members 32, 34 mounted across the shelf 14. The rear intermediate left-to-right member 32 includes a plurality of upwardly-extending, rectangular teeth 36, which help maintain the roller tracks 18 and guide members 30 in their proper horizontal location. The front intermediate support member 34 supports the weight of the roller tracks 18 and guide members 30. It is understood that there may be more than one intermediate member 34 on the shelf 14. For simplicity in the description, the roller tracks 18, guide members 30, and left-to-right members 32, 34 may be referred to as beams.

FIG. 3 is a perspective view of the middle shelf 14A of FIG. 1, which is very similar to the top shelf 14 but differs in some respects. This shelf 14A also includes left, right, rear, and front frame members 22, 24, 26, 28 connected together to form a rectangular frame. It also includes a rear left-to-right intermediate member 32A and a front left-to-right intermediate support 34. The rear intermediate member 32A differs from the rear intermediate member 32 on the top shelf 14, in that it includes a rear comb 38 and a forward comb 40, which will be described in more detail later.

This shelf 14A also includes roller tracks 18A, 18B and a guide member 30 extending in a front-to-back direction on the shelf. This second shelf 14A differs from the top shelf 14 in that, because the rear left-to-right member 32A includes a rear comb 38 and a forward comb 40, it is possible to have beams 18A extending from the rear frame member 26 to the rear intermediate member 32A and other beams 18B extending from the rear intermediate member 32A to the front frame member 28. It may be desirable to put more roller tracks 18A in the rear portion of the shelf 14A to help absorb the impact of products being dropped on the back of the shelf 14A and fewer roller tracks 18B in the front portion of the shelf to carry the products to the front of the shelf. Alternatively, it may be desirable to make the rear roller tracks 18A heavier duty than the forward roller tracks 18B, so that the rear tracks 18A can absorb the impact of the packages without breaking, and so that the forward tracks 18B are not any more expensive than necessary to carry the anticipated load. It is understood that more intermediate members 34 may be added as needed for capacity.

Figure 3A:
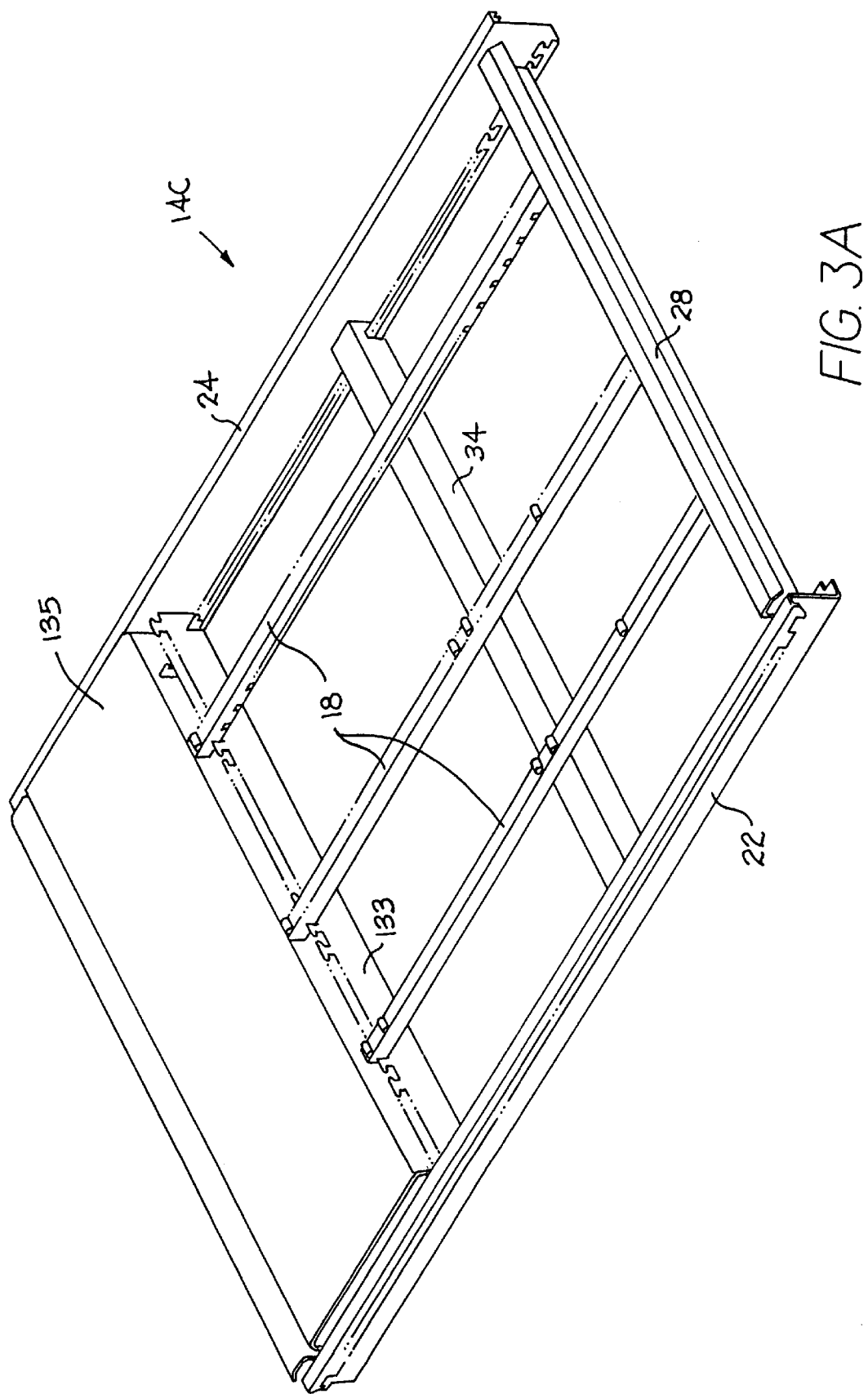
FIG. 3A is a perspective view of an alternative shelf for the rack of FIG. 1.

FIG. 3A shows an alternative shelf 14C, which could be used on the rack 10 of FIG. 1. The shelf 14C could replace the middle shelf 14A, or, if it were turned around and the sides 22, 24 bent downwardly near the front, it could replace the bottom shelf 14B. The shelf 14C of FIG. 3A includes a solid steel plate 135 in the back of the shelf, rather than having heavy duty rollers, or it could be turned around so that the solid steel plate 135 is in the front. This shelf 14C has left, right, forward and rear frame members 22, 24, 26, 28 as in the previous embodiments, but the rear frame member 26 is hidden by the plate 35. This shelf 14C includes a rear intermediate frame member 133, which is described with respect to FIG. 16, and the roller tracks 18 are mounted on the comb of that rear intermediate frame member 133. It also includes a forward intermediate frame member 34, which is the same as in other embodiments.

FIGS. 4–10 show in more detail how various beams are mounted on the shelves and how the frame members are put together to make the shelves.

Figure 4:
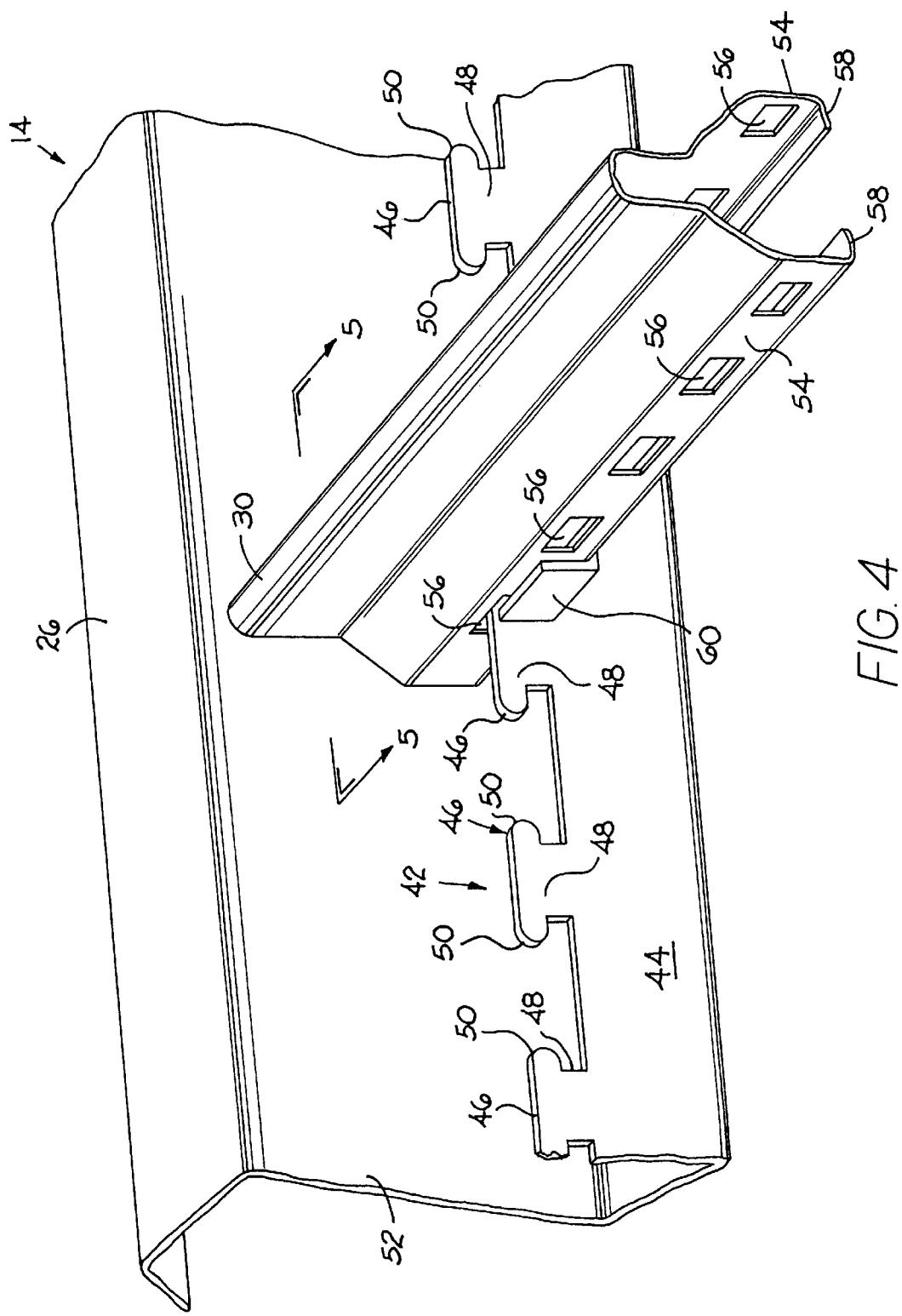
FIG. 4 is a perspective view of the connection between the guide rail and rear frame member of the shelf of FIG. 2.
Figure 5:
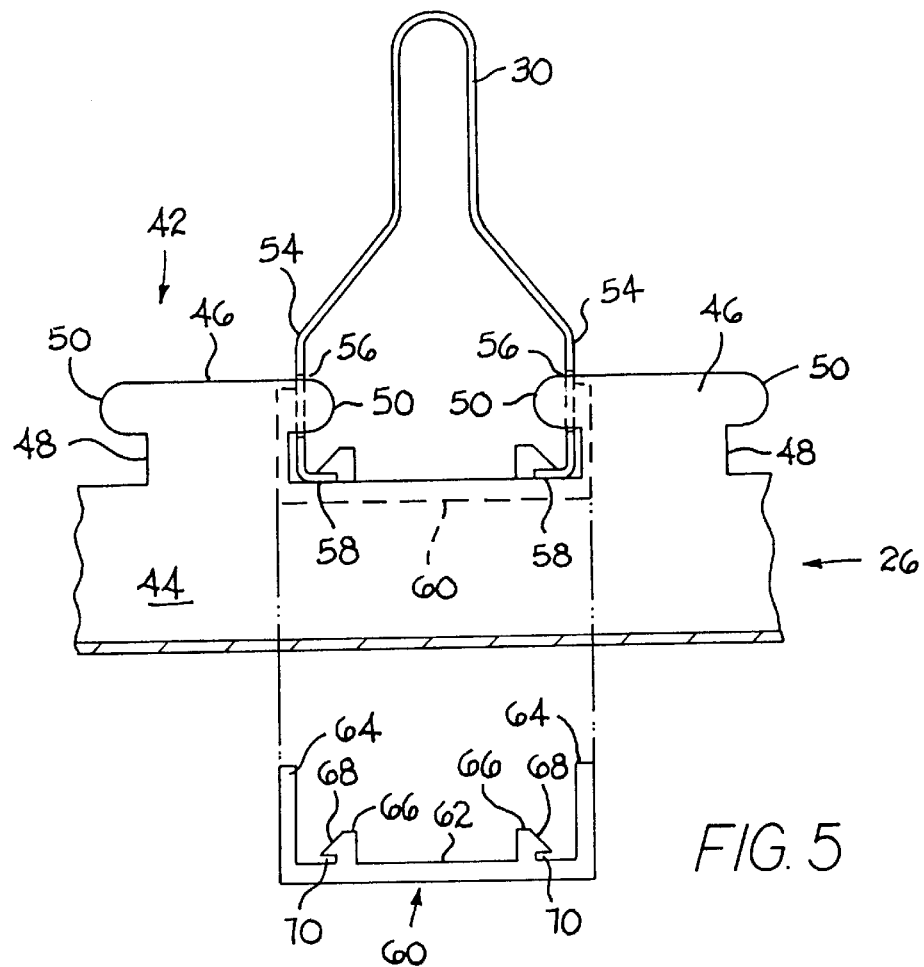
FIG. 5 is a view taken along the line 5—5 of FIG. 4 and shows an exploded view of a clip for the guide rail.

FIGS. 4 and 5 show how a guide member 30 is mounted on the shelf 14. The rear frame member 26 has a substantially S-shaped cross-section, which includes a substantially vertical comb 42. The comb 42 is made up of a flat base 44 and a plurality of upwardly-projecting trees 46 extending from the base 44. Each of the trees 46 includes a vertical projection portion 48 and two horizontally-extending arms 50. The arms 50 are rounded on their ends. The rear frame member 26 also includes a substantially vertical stop portion 52 spaced a distance away from the comb 42.

The guide member or guide beam 30 has a substantially inverted U-shaped cross-section, including two spaced-apart legs 54, which define opposed holes 56. The bottom portions 58 of the legs 54 are curved inwardly, toward each other.

Clips 60, shown in FIGS. 4 and 5, are mounted on the guide members 30 about twelve inches from each end before installation. The clips 60 are preferably made of a rigid material. Each clip 60 has a substantially U-shaped cross-section, with a horizontal base 62, two upwardly-extending legs 64, and two upwardly-projecting hooks 66 between the legs 64. The tapered faces 68 of the hooks 66 on the clip 60 cause the legs 54 of the guide 30 to flex outwardly as the clip 60 is being pushed up into the bottom of the guide member 30. Then, when the inwardly-curved bottom 58 of each leg 54 of the guide member 30 reaches the recess 70 below the respective hook 66, the legs 54 return to their normal position, locking the clip 60 onto the bottom of the guide member 30.

The guide member 30 is then installed onto the comb 42 of the rear member 26 by first rotating the guide member 30 approximately 30 degrees. One leg 54 is then pushed down onto the comb 42, allowing one of the arms 50 of one of the trees 46 to penetrate the hole 56 in the leg 54. The legs 54 are then squeezed together and rotated back to the horizontal position, allowing another corresponding arm 50 to align with the hole 56 in the opposing leg 54. This action is assisted by the radius on the arm 50. When the legs 54 are released, the arms 50 engage the holes 56 in the legs 54. The clip 60 is then slid toward the end of the guide 30 until it reaches the flat base 44 of the frame member. In that position, shown in FIG. 4, the clip 60 keeps the legs 54 of the guide member 30 from being squeezed together by the force of products being loaded onto the shelf. The comb 42 keeps the legs 54 of the guide member 30 from spreading out and deforming, and the arms 50, projecting through the holes 56, prevent the guide member 30 from being disengaged from the comb 42 by an upward or downward force.

As can be seen in FIG. 2, the front frame member 28 also includes a comb 42, which is identical to the comb 42 on the rear frame member 26. The front of the guide beam 30 is mounted on the front comb 42 in the same manner as the rear of the guide beam 30 is mounted on the rear comb 42. Thus, both the front and rear of the guide beam 30 are well-secured on the shelf 14 without the need for special tools and with very little labor.

Figure 7A:
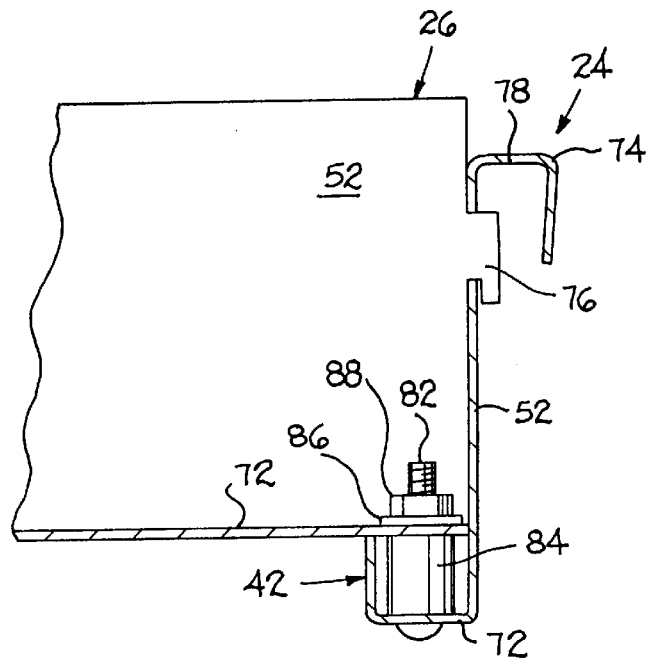
FIG. 7A is a view taken along the line 7A—7A of FIG. 7.
Figure 7:
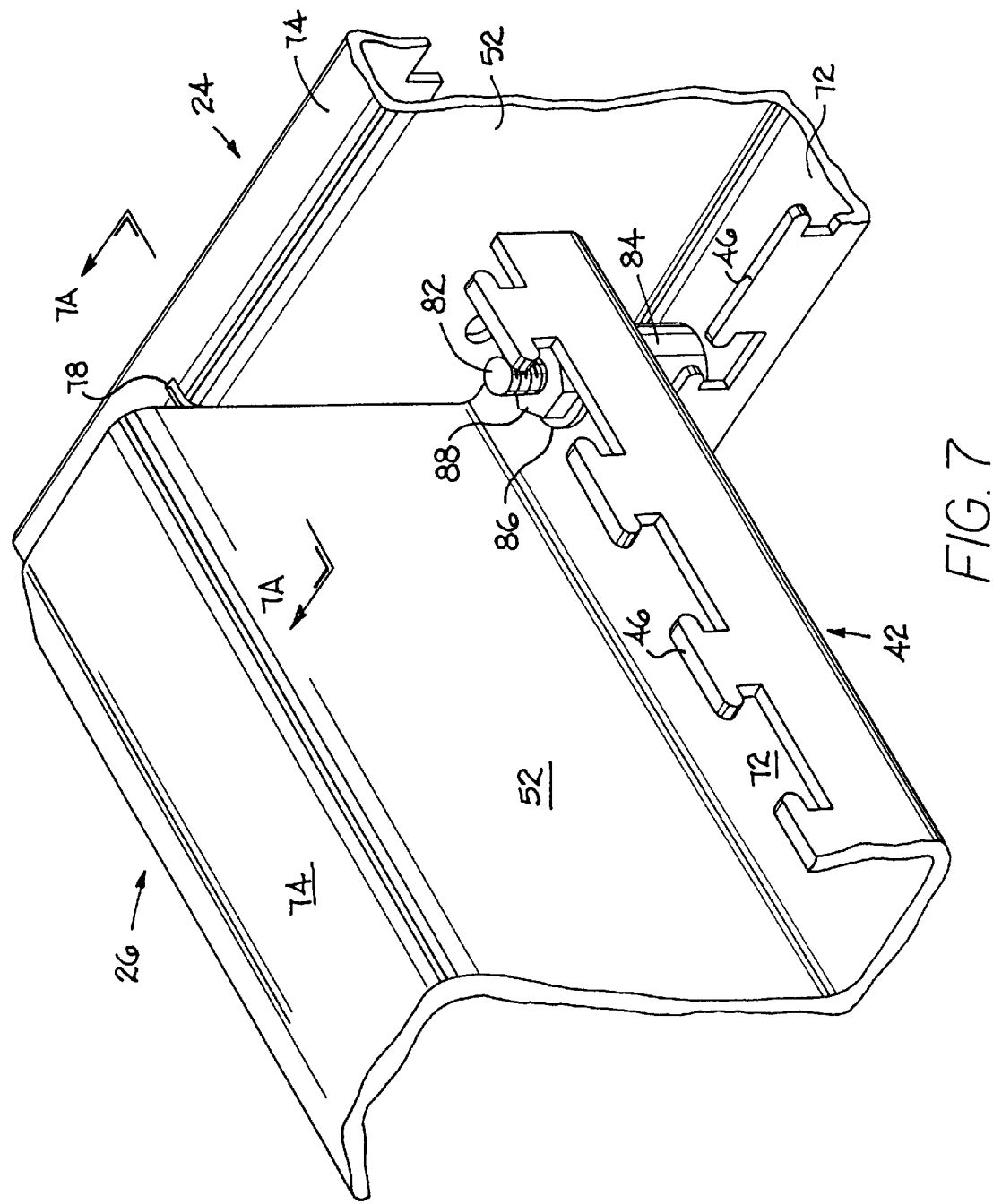
FIG. 7 is a broken-away perspective view of the assembled right rear corner of the frame of FIG. 2.

FIGS. 6, 7, and 7A show how the rear frame member 26 and right frame member 24 are connected together. This connection mechanism is the same at all four corners of the shelf 14. It should be noted that all the frame members 22, 24, 26, 28 have substantially S-shaped cross sections, including a vertical leg 52, a base 72, and an upwardly-projecting comb 42 at the innermost edge of the base 72. At the top of each vertical leg 52 is a horizontal lip 74. FIG. 6 shows an outwardly and downwardly-projecting hook 76 at the right end of the rear frame member 26. There is a mirror image hook (not shown) projecting from the left end of the rear frame member 26, and there are identical left and right hooks (not shown) projecting from the left and right ends of the front frame member 28.

The right side frame member 24 defines a vertical slot 78 in its vertical leg 52, which extends out into the horizontal lip 74 far enough that the hook 76 of the rear frame member 26 can be dropped vertically straight down, into the slot 78. There is a square hole 79 in the base 72 of the right frame member 24, and there is a circular hole 80 in the base 72 of the rear frame member 26, so that, once the hook 76 has reached the bottom of the slot 76, a carriage bolt 82 can be inserted from the bottom 72 of the right frame member 24, through the square hole 79, through a spacer 84, through the circular hole 80, and through a flanged locknut 88, with the nut 88 being tightened down to secure the frame members together. The base 72 of the rear frame member 26 is then resting on the spacer 84, which rests on the base 72 of the side frame member 24. The flange 86 of the locknut 88 may alternatively be a separate lock washer. There are similar slots 78 (not shown) in the front of the right frame member 24 and in the front and rear of the left frame member 22, so all four corners of the shelf 14 are secured together in the same manner. The corners of the other shelves 14A, 14B are assembled in the same manner.

FIGS. 7 and 7A show the rear 26 and right side 24 members after they have been connected together.

Figure 8:
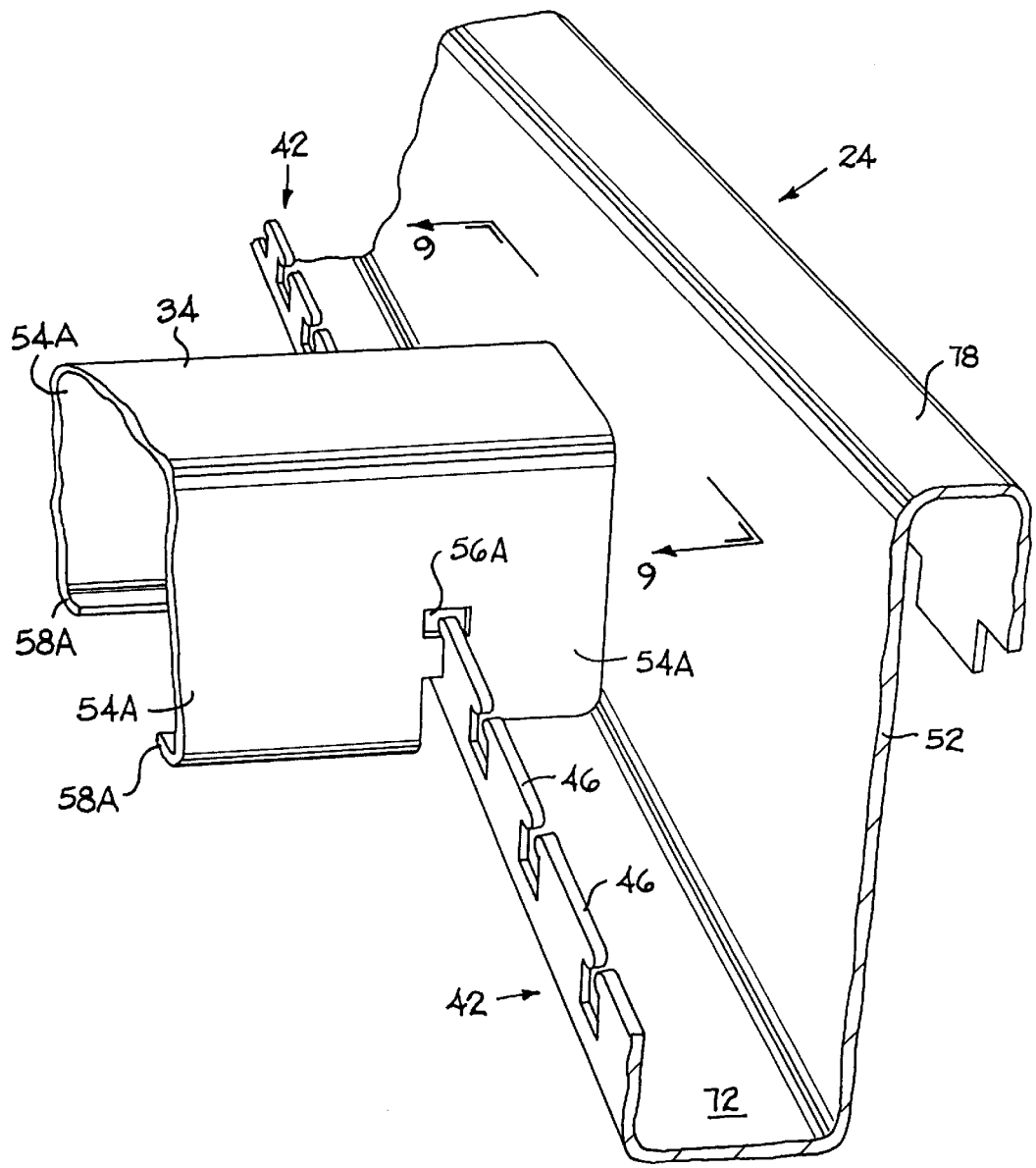
FIG. 8 is a broken-away perspective view of the connection between the forward intermediate support and the right frame member of FIG. 2.
Figure 9:
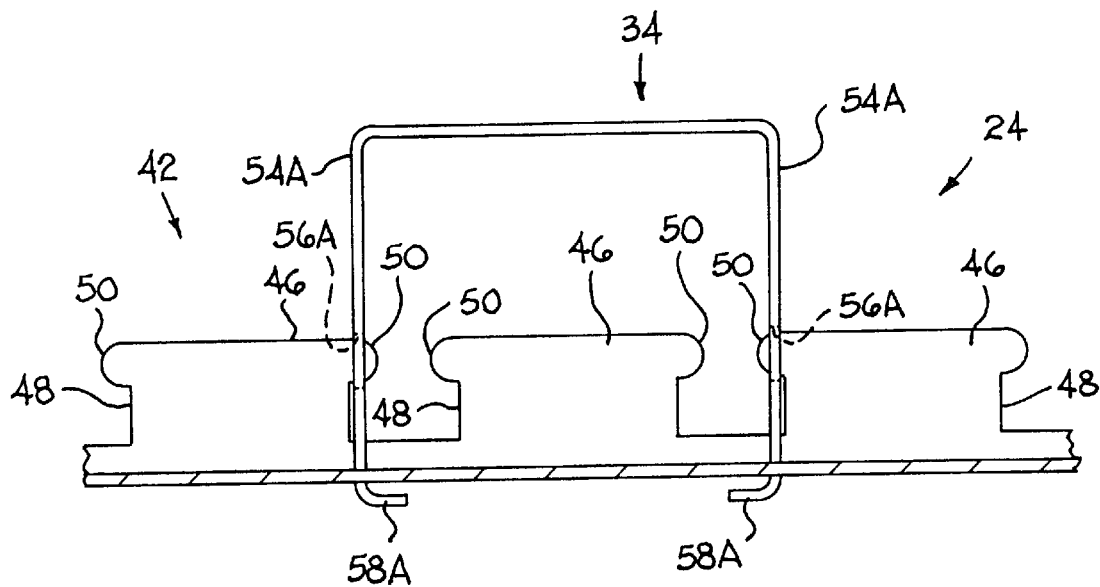
FIG. 9 is a view taken along the line 9—9 of FIG. 8.

FIGS. 8 and 9 show the connection between the forward left-to-right intermediate support beam 34 and the right frame member 24, which is a mirror image of the connection between the intermediate support beam 34 and the left frame member 22. This forward intermediate support beam 34 has an inverted U-shaped cross-section, including two downwardly-projecting legs 54A, and the bottom edges 58A of the legs 54A are curved toward each other, as was the case with the guide member 30. There are also opposed holes 56A in the legs 54A.

The intermediate support beam 34 is installed onto the comb 42 of the right frame member 24 by rotating the intermediate support beam 34 approximately 20 degrees and pushing one leg 54A between two trees 46 of the comb 42. This allows one arm 50 to penetrate the hole 56A on one leg of the intermediate support beam 34. The legs 54A are then squeezed together and rotated into position and released, allowing the arms 50 of two different trees 46 to penetrate the holes 56A, and securing the intermediate beam 34 in place. The rounded ends of the arms 50 assist in this installation. In this case, there is one unused tree 46 between the legs 54A of the intermediate support member 34. The left end of the intermediate support member 34 is connected to the left frame member 22 in the same way. The forward intermediate support 34 supports the weight of the roller beams 18 and the guide 30, by the endmost portions of the legs 54A resting on the respective bases 72 of the respective left and right frame members 22, 24.

FIGS. 10 and 11 show how the roller beams 18A, 18B are connected to the rear intermediate member 32A of the shelf 14A of FIG. 3. This connection is the same as the connection between the roller beams 18, 18A and the rear frame member 26 and the same as the connection between the roller beams 18, 18B and the front frame member 28. The rear intermediate member 32A includes two combs 38, 40, which are identical to the combs 42 on the front and rear members 26, 28. Each of the roller beams 18, 18A, 18B has an inverted U-shaped cross-section, including two vertical legs 54B, and the bottom edges 58B of the legs 54B curve inwardly, toward each other. Rollers 90, which freely rotate on axles 92, project out through openings in the top of the roller beams 18, 18A, 18B. The axles 92 are fixed on the legs 54B of the roller beams 18, 18A, 18B.

The roller beams 18, 18A, 18B are installed onto the combs 38, 40, 42 by rotating the roller beams 18, 18A, 18B approximately 30 degrees and pushing one leg 54B between two trees 46. This allows one arm 50 to penetrate the hole 56B on one leg 54B of the roller beam 18, 18A, 18B. The legs 54B are then squeezed together and rotated into position and released, allowing the arms 50 of two different trees 46 to penetrate the holes 56B and securing the beam 18, 18A, 18B in place. The rounded ends of the arms 50 assist this installation. The weight of the roller beams 18, 18A, 18B is supported by the bottom 58B of the roller tracks resting on the base 44 of the combs 38, 40, 42.

FIG. 12 shows how the rear intermediate member 32 of the shelf 14 is mounted, and FIGS. 13, 14, and 14A show how the rear intermediate support member 32A of the shelf 14A is mounted on the combs 42 of the left and right frame members 22, 24. The rear intermediate support members 32, 32A have U-shaped cross-sections, including a base 57, 57A and vertical legs 58C, 58D. In the case of the rear intermediate support member 32, the legs 58C, 58D are of unequal length. The legs 58C, 58D define holes 56C, 56D, which receive the arms 50 of the trees 46. The bases of both the intermediate beams 32, 32A are notched at 59, as shown in FIGS. 14 and 14A, to permit the bases 57, 57A to pass by the arms 50 when the support members are inserted into the combs 42 of the side frame members. Then, the legs 58C, 58D are squeezed together and the beams 32, 32A are rotated into position until the arms 50 enter their respective holes 56C, 56D.

The weight of the intermediate beams 32 is supported on the side members by the web portions 61 of the legs 58C, 58D directly above the notches 59 resting on the bases 44 of the respective combs 42.

The weight of the intermediate beams 32A is supported on the side members by the extended legs 63 of the intermediate beams 32A resting on the base 72 of the side members 22, 24. This makes the intermediate beams 32A better able to carry weight than the intermediate beams 32.

FIGS. 15, 16, and 17 show alternative preferred embodiments of the intermediate support beams. These beams 132, 132A, 133 are modifications of the basic forward intermediate support beam 34, shown in FIG. 8. The basic beam 34 to has been modified by fastening on combs. The beam 132 of FIG. 17 has an added comb 143, with rectangular teeth 136. The comb 143 is fastened onto the beam 34 by means of self-tapping screws 144. This beam 132 would serve to replace the beam 32 of FIG. 2. This beam 132 mounts on the side members 22, 24 in the same manner as the forward intermediate support beam 34 mounts on them. It is superior to the intermediate member 32, because it can provide greater support. Also, since it is made by modifying the basic beam 34, the manufacturing process is simplified.

The beam 132A of FIG. 15 would serve to replace the beam 32A of FIG. 3. This beam 132A is made by fastening two treed combs 142 onto the legs 54A of the basic beam 34. The treed combs 142 serve the same function as the trees 46 in the beam 32A, but this beam provides greater structural strength and a large, flat top support surface, enabling it to support the weight of roller tracks 18, 18B, 18B and guides 30 better than the beam 32A. Also, since it is made by modifying the basic beam 34, the manufacturing process is simplified.

The beam 133 of FIG. 16 would be used with the shelf 14A of FIG. 1 or with the shelf 14C of FIG. 3A. This beam 133 again is made by fastening a treed comb 142 onto the basic beam 34. The resulting beam 133 provides support to the weight of the roller tracks 18 and guides 30 mounted on it, as well as preventing the track beams 18 and guide beams 30 from shifting relative to the frame.

It will be obvious to those skilled in the art that modifications may be made to the embodiments described above without departing from the scope of the present invention.

What is claimed is:

1. A shelf for a rack, comprising: left, right, forward, and rear frame members connected together to form a substantially rectangular frame;

at least one of the frame members including a mounting comb, having a plurality of upwardly-projecting, substantially rigid trees, each of said trees defining at least one horizontally-projecting arm;

a beam, mounted on said mounting comb, and having a substantially U-shaped cross-section, including a base and two spaced-apart legs, wherein each of the legs define hole, and each of said holes receives one of said horizontally-projecting arms, such that said beam is prevented from moving upwardly, downwardly, forward, and back relative to said trees.

2. A shelf for a rack as recited in claim 1, wherein a spacing is defined between said spaced-apart legs, and further comprising a clip mounted on said beam and extending between the legs of the beam so as to maintain the spacing between the legs of the beam so that the beam cannot accidentally become dislodged from the arms.

3. A shelf for a rack as recited in claim 1, wherein said beam is a roller track, including a plurality of rollers.

4. A shelf for a rack as recited in claim 1, wherein said beam is a guide rail.

5. A shelf for a rack as recited in claim 1, and further comprising a plurality of vertical supports, wherein said frame is mounted on said vertical supports with said rear frame member at a higher elevation than said front frame member.

6. A shelf for a rack as recited in claim 1, wherein said rectangular frame defines four corners; and wherein one of said corners is formed by connecting together two of said frame members, one of said frame members having an end and including a hook projecting out said end, and the other of said frame members including a vertical portion and a horizontal portion, and defining a vertical slot in said vertical portion extending into said horizontal portion a sufficient distance so that said hook may be moved directly vertically downwardly into said slot to join the two members together.

7. A shelf for a rack as recited in claim 1, wherein each of said frame members has two ends, and adjacent frame members are connected together at right angle connections to form a rectangle; at least one of said connections comprising an outwardly and downwardly-directed hook projecting from the end of one of said adjacent frame members; the other of said frame members having a vertical wall and an upper horizontal wall extending from said vertical wall, and defining a vertical slot in said vertical wall extending into said upper horizontal wall far enough that, when said one frame member is placed above the other frame member, with the hook aligned with the slot and is moved directly downwardly, the hook enters the vertical slot; and further comprising aligned holes in said one frame member and said other frame member which permit a bolt to be inserted to lock the one frame member and other frame member together after the hook has entered the slot.

8. A shelf for a rack as recited in claim 1, wherein said U-shaped cross-section beam is installed on said mounting comb such that the U-shaped cross-section is inverted, and wherein at least one upwardly-projecting mounting comb projects upwardly from said beam.

9. A shelf for a rack as recited in claim 1, wherein the holes are located in the sides of the spaced-apart legs, so that the arms of the trees extend horizontally through the holes.

10. A shelf for a rack comprising:

left, right, forward and rear frame members including a mounting comb, having a plurality of upwardly-projecting trees, each of said trees defining at least one horizontally-projecting arm;

a beam, mounted on said mounting comb, and having a substantially U-shaped cross-section, including a base and two spaced-apart legs, wherein the legs define holes which receive the horizontally-projecting arms from said trees, such that said beam is prevented from moving upwardly, downwardly, forward and back relative to said trees, wherein said beam is an intermediate left-to-right support extending from said left frame member to said right frame member; and wherein each of said left and right frame members has one of said mounting combs with said upwardly-projecting trees; said intermediate left-to-right support itself defining forward and rear intermediate combs, including upwardly-projecting trees, each of said trees of said intermediate combs defining at least one horizontal arm; and further comprising a first plurality of front-to-back-directed U-shaped beams mounted from said rear frame member to said intermediate left-to-right support, wherein said first plurality of front-to-back-directed U-shaped beams define left and right legs, which define holes that receive said horizontal arms of said trees; and a second plurality of front-to-back-directed U-shaped beams mounted from said intermediate left-to-right support to said forward frame member, wherein said second plurality of front-to-back-directed U-shaped beams also has left and right legs, which also define holes that receive said horizontal arms of said respective trees.

11. A shelf for a rack as recited in claim 10, wherein the number of front-to-back-directed beams in said first plurality of beams is greater than the number of said second plurality of front-to-back-directed beams.

12. A shelf for a rack as recited in claim 10, wherein at least some of the first plurality of front-to-back-directed beams are heavier duty than the second plurality of front-to-back-directed beams.

13. A rack, comprising:

a plurality of vertical supports;

a plurality of shelves mounted on said vertical supports; each of said shelves including left, right, forward, and rear frame members connected together to form a substantially rectangular frame;

at least one of the frame members including a mounting comb, having a plurality of upwardly-projecting, substantially rigid trees, each of said trees defining at least one horizontally-projecting arm;

a beam, mounted on said mounting comb, and having a substantially U-shaped cross-section, including a base and two spaced-apart legs, wherein the legs define holes which receive the horizontally-projecting arms from said trees, such that said beam is prevented from moving upwardly, downwardly, forward, and back relative to said trees.

* * * * *

UNITED STATES PATENT AND TRADEMARK OFFICE
CERTIFICATE OF CORRECTION

PATENT NO. : 6,105,798
DATED : August 22, 2000
INVENTOR(S) : Robert D. Gruber and Allen B. Kautz It is certified that error appears in the above-indentified patent and that said Letters Patent is hereby corrected as shown below:

Claim 1, line 11, delete "define" and insert therefor -- defines a--.

Signed and Sealed this

Twenty-fourth Day of April, 2001

Attest:

NICHOLAS P. GODICI

*Attesting Officer*  *Acting Director of the United States Patent and Trademark Office*